United States Patent
Mao et al.

(10) Patent No.: US 12,324,981 B2
(45) Date of Patent: Jun. 10, 2025

(54) MANIPULATING DEVICE

(71) Applicant: GOERTEK INC., Shandong (CN)

(72) Inventors: Dongsheng Mao, Shandong (CN); Xinfeng Yang, Shandong (CN); Yongqiang Wang, Shandong (CN); Yuhang Dong, Shandong (CN); Fei Tan, Shandong (CN)

(73) Assignee: GOERTEK INC., Weifang (CN)

( * ) Notice: Subject to any disclaimer, the term of this patent is extended or adjusted under 35 U.S.C. 154(b) by 420 days.

(21) Appl. No.: 17/790,214

(22) PCT Filed: Dec. 5, 2020

(86) PCT No.: PCT/CN2020/134107
§ 371 (c)(1),
(2) Date: Jun. 30, 2022

(87) PCT Pub. No.: WO2021/135829
PCT Pub. Date: Jul. 8, 2021

(65) Prior Publication Data
US 2023/0038077 A1    Feb. 9, 2023

(30) Foreign Application Priority Data
Dec. 30, 2019  (CN) .......................... 201911395227.X

(51) Int. Cl.
*A63F 13/24*    (2014.01)

(52) U.S. Cl.
CPC ...... *A63F 13/24* (2014.09); *A63F 2300/1043* (2013.01)

(58) Field of Classification Search
CPC .......................... A63F 13/24; A63F 2300/1043
See application file for complete search history.

(56) References Cited

U.S. PATENT DOCUMENTS

2003/0080939 A1*  5/2003  Kobayashi ............ G05G 9/047
                                                          345/156
2004/0008861 A1    1/2004  Lu
                   (Continued)

FOREIGN PATENT DOCUMENTS

CN    108710441 A    10/2018
CN    110013666 A     7/2019
                (Continued)

OTHER PUBLICATIONS

International Search Report from International Application No. PCT/CN2020/134107 mailed Feb. 25, 2021.

*Primary Examiner* — Werner G Garner
(74) *Attorney, Agent, or Firm* — Shih IP Law Group, PLLC

(57) ABSTRACT

A manipulating device comprising: a rocker, a supporting member a magnetic assembly and a coil assembly, wherein the rocker is rotatable around the supporting member; the coil assembly is disposed opposite to the rocker, the magnetic assembly is disposed on one end of the rocker adjacent to the coil assembly; the magnetic assembly (3) comprising a central magnet (31) and at least one side magnets. By providing the magnetic assembly on the one end of the rocker adjacent to the coil assembly (4), the power for rotating the rocker is adjusted by interaction force between the magnetic assembly and the coil assembly, and the interaction force between the magnetic assembly and the coil assembly can be further adjusted by adjusting the magnitude of the current of the coil assembly.

9 Claims, 4 Drawing Sheets

(56) References Cited

U.S. PATENT DOCUMENTS

2013/0248276 A1* 9/2013 Chacko .................. B60T 7/085
340/438
2016/0357272 A1* 12/2016 Kumahara ............ G06F 3/0383

FOREIGN PATENT DOCUMENTS

| CN | 111084982 A | 5/2020 |
| CN | 111214827 A | 6/2020 |
| CN | 211963066 U | 11/2020 |

* cited by examiner a                                    b

MANIPULATING DEVICE

TECHNICAL FIELD

The present disclosure belongs to a technical field of mechanical manipulating device, and more particularly, the present disclosure relates to a manipulating device.

BACKGROUND ART

A game controller is a common component of electronic game apparatus. A virtual character of the game can be controlled by manipulating a rocker or a button and the like of the game controller. The conventional game controllers mainly control directions by cross direction key, and issue action commands by function keys.

As upgrading of hardware of game apparatus, modern game controllers are additionally provided with an analogical rocker (which can control directions and viewing angles at the same time). The analogical rocker can input control signals by swinging of the rocker, and output signal can be controlled in 360°. Especially in AR or VR games, the analogical rocker is capable of providing convenient manipulating experience to a user.

However, the existing rocker also has various problems. For example, when the rocker is swinged, the control to the force magnitude for swinging the rocker is mainly accomplished by the region of the force magnitude generated by arms of the user. Due to uncontrollable of the force magnitude of the arms of the user and a swinging resistance of the rocker itself, the rocker may provide poor using experience to the user.

SUMMARY OF THE INVENTION

An object of the present disclosure is to provide a manipulating device. According to a first aspect of the present disclosure, there is provided with a manipulating device, comprising:

- a rocker, one end of the which is a manipulating end, another end of the which is provided with a magnetic assembly, and the rocker is configured to be rotatable; and
- a coil assembly disposed opposite to the rocker and adjacent to the magnetic assembly,
- wherein the magnetic assembly comprising a central magnet and at least one side magnets, and the coil assembly is configured to be capable of being supplied with an electrical signal, and an interaction force is generated between the coil assembly and the magnetic assembly.

Optionally, the central magnet is formed to have a column shape, and one end of the central magnet having the column shape is fixedly connected to the rocker.

Optionally, another end of the central magnet having the column shape is formed in a spherical surface.

Optionally, a magnetization direction of the central magnet is parallel to an axial direction of the central magnet having the column shape, and a magnetization direction of the side magnet is perpendicular to the axial direction of the central magnet having the column shape.

Optionally, the manipulating device further comprises a supporting member, and the rocker is rotatable around the supporting member.

Optionally, the manipulating device further comprises a housing, and both the supporting member and the coil assembly are fixedly connected to the housing.

Optionally, the manipulating device further comprises a fitting member, wherein the fitting member is a magnet, and the magnet is positioned in the middle of the coil assembly.

Optionally, the manipulating device further comprises a fitting member, the fitting member is an iron core, and the iron core is positioned in the middle of the coil assembly.

Optionally, a central axis of the coil assembly passes through a center around which the rocker rotates.

Optionally, the rocker is symmetrically disposed with respect to an A-A plane.

Compared with the prior art, a technical effect of the present disclosure is that:

The present disclosure discloses a manipulating device comprising a rocker, a magnetic assembly and a coil assembly, one end of the rocker is a manipulating end, the other end of the rocker is provided with the magnetic assembly, and the rocker is rotatable; the coil assembly is disposed opposite to the rocker and is adjacent to the magnetic assembly; and the magnetic assembly comprises a central magnet and at least one side magnets. The present disclosure adjusts power for rotating the rocker by interaction force between the magnetic assembly and the coil assembly, to improve manipulation experience of the user.

Through the following detailed description of the exemplary embodiments of the present disclosure with reference to the accompanying drawings, other features and advantages of the present disclosure will become clear.

BRIEF DESCRIPTION OF THE DRAWINGS

The accompanying drawings incorporated into and constituting a part of the specification show embodiments of the present disclosure and are used to explain the principle of the present disclosure together with the descriptions thereof.

FIG. 4 is a schematic structural diagram of the magnetic assembly of the manipulating device of the present disclosure, wherein FIG. 4a is a front view of the magnetic assembly, and FIG. 4b is a top view of the magnetic assembly;

FIG. 6 is a schematic diagram of a magnetization direction of the magnetic assembly of the manipulating device according to the present disclosure, wherein FIG. 6a is a schematic diagram of a magnetization direction of a central magnet of the magnetic assembly, and FIG. 6b is a schematic diagram of a magnetization direction of a side magnet of the magnetic assembly; and FIG. 7 is a schematic diagram of a magnetic field direction of the magnetic assembly of the manipulating device according to the present disclosure, wherein FIG. 7a is a schematic diagram of a magnetization direction of the magnetic assembly in a cross section, and FIG. 7b is a schematic diagram of a magnetization direction of the magnetic assembly in the top view.

Figure 1:
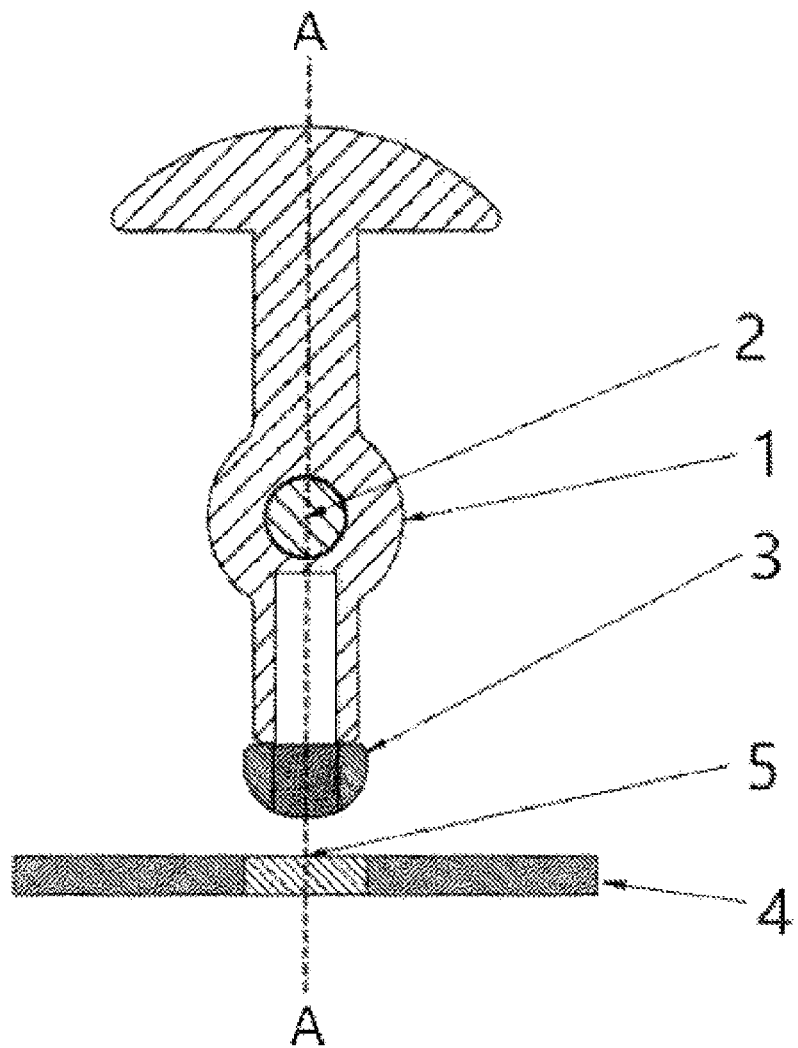
FIG. 1 is a schematic structural diagram of a manipulating device at a balance position according to the present disclosure.

Wherein: 1—rocker; 2—supporting member; 3—magnetic assembly; 31—central magnet; 32—side magnet; 4—coil assembly; 5—fitting member.

DETAILED DESCRIPTION OF EMBODIMENTS

Various exemplary embodiments of the present disclosure will now be described in detail with reference to the accompanying drawings. It should be noted that the relative arrangement, numerical expressions and values of the parts and steps described in these embodiments do not limit the scope of the present disclosure unless otherwise specified.

The following descriptions of at least one exemplary embodiment are actually only illustrative and in no way serves as any limitation to the present disclosure and its application or use.

The technologies, methods and devices known to those skilled in the art may not be discussed in detail, but in appropriate circumstance, the technologies, methods and devices should be regarded as a part of the specification.

In all of the examples shown and discussed here, any specific value should be interpreted as merely exemplary but is not a limitation. Therefore, other examples of exemplary embodiments may have different values.

It should be noted that similar reference numerals represent similar items in the following drawings. Therefore, once one item is defined in one drawing, it does not need to be further discussed in subsequent drawings.

Figure 3:
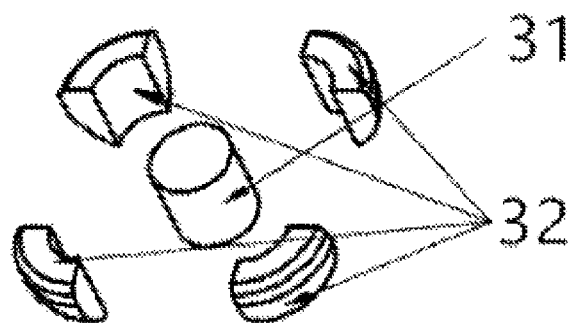
FIG. 3 is a schematic structural diagram of a magnetic assembly of the manipulating device according to the present disclosure.

With reference to FIG. 1 and FIG. 3, the present disclosure discloses a manipulating device, comprising:

a rocker 1, a supporting member 2, a magnetic assembly 3 and a coil assembly 4, the rocker 1 is rotatable around the supporting member 2, wherein, the coil assembly 4 is disposed opposite to the rocker 1, and the magnetic assembly 3 is disposed at one end of the rocker 1 adjacent to the coil assembly 4.

The magnetic assembly 3 comprises a central magnet 31 and at least one side magnets 32, the coil assembly 4 is configured to be capable of supplied with an electrical signal, and an interaction force is generated between the coil assembly 4 and the magnetic assembly 3.

The supporting member 2 may be a rotating shaft, and the rocker 1 rotates around an axis of the supporting member 2; the supporting member 2 may also be a universal shaft, and the rocker 1 rotates in all direction around a center of the universal shaft of the supporting member 2.

The coil assembly 4 may be a planar coil, and the planar coil can be provided with uniform windings to generate a uniform and stable electric field, such that a stable interaction force is generated between the coil assembly 4 and the magnetic assembly 3.

The rocker 1 is generally manipulated by the user to rotate around the supporting member 2, but it may bring inconvenience to the user due to heavy weight of the rocker 1 or relatively larger rotating resistance between the rocker 1 and the supporting member 2. In the present disclosure, by providing the magnetic assembly 3 at the one end of the rocker 1 adjacent to the coil assembly 4, the power for rotating the rocker 1 is increased by the interaction force between the magnetic assembly 3 and the coil assembly 4, and the interaction force between the magnetic assembly 3 and the coil assembly 4 can be further adjusted by adjusting a magnitude of current of the coil assembly 4, to improve the manipulation experience of the user.

In addition, sometimes, the user needs to have certain damping feeling when manipulating the supporting member 2 to rotate, so as to achieve a more realistic manipulation experience. Moreover, the interaction force may be generated between the magnetic assembly 3 and the coil assembly 4 by adjusting a direction of the current of the coil assembly 4, so that the damping feeling during the supporting member 2 rotates can be increased. Besides, the interaction force between the magnetic assembly 3 and the coil assembly 4 may be further adjusted by adjusting the magnitude of the current of the coil assembly 4, to improve the manipulation experience of the user.

Furthermore, the magnetic assembly 3 comprises a central magnet 31 and at least one side magnets 32, the magnetization direction of the central magnet 31 and the magnetization direction of the side magnet 32 may intersect with each other, or the magnetization direction of the central magnet 31 and the magnetization direction of the side magnet 32 may be perpendicular to each other to form a Halbach magnetic assembly, which greatly increases the magnetic field strength of the magnetic assembly 3, and generates a stronger interaction force between the coil assembly 4 and the magnetic assembly 3, thereby improving the manipulation efficiency and manipulation experience of the manipulating device.

Optionally, referring to FIGS. 1, 3, 4 and 5, the central magnet 31 may has a column shape, one end of the central magnet 31 having the column shape is fixedly connected to the rocker 1, and the other end of the central magnet 31 having the column shape formed in a cone shape.

Specifically, the central magnet 31 may has a cylinder shape or a prism shape, and the prism shape may be a triangular prism, a quadrangular prism, a pentagonal prism or a hexagonal prism, which is not limited in the present disclosure.

When the central magnet 31 is formed into a cylinder shape, the central magnet 31 having the cylinder shape and the rocker 1 may be welded or bonded, and both the connection manners of welding or bonding can ensure the firmness of the connection between the central magnet 31 and the rocker 1. Further, forming the other end of the central magnet 31 having the cylinder shape into a cone shape can not only have a good magnetic convergence effect, but also improve smoothness at the other end of the central magnet 31 having the cylinder shape.

Optionally, the other end of the central magnet 31 having the cylinder shape may also be provided in a spherical surface, and the other end of the central magnet 31 is the end portion adjacent to the coil assembly 4, and the structure of the spherical surface has a good magnetic convergence effect, thereby improving the interaction force between the coil assembly 4 and the magnetic assembly 3. In addition, the arrangement of forming the end portion of the central magnet 31 to have a spherical surface can improve the smoothness of the end portion of the central magnet 31, and can reduce air resistance during the rotation of the rocker 1.

Figure 6:
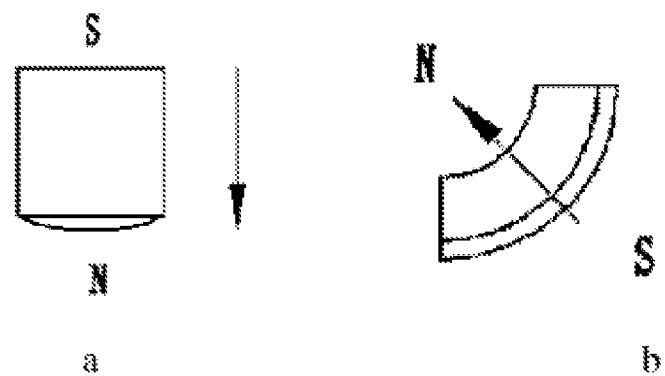
Figure 7:
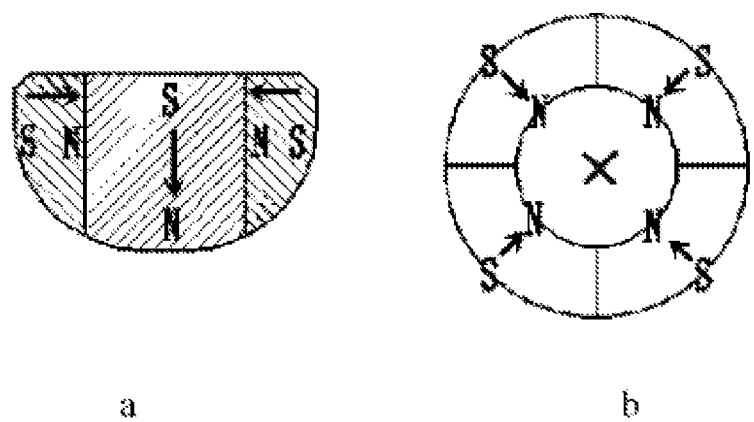

Optionally, referring to FIGS. 6 and 7, the magnetization direction of the central magnet 31 in FIG. 6a is parallel to the axial direction of the central magnet 31 having the cylinder shape, and the magnetization direction of the side magnets 32 in FIG. 6b is perpendicular to the axial direction of the central magnet 31 having the cylinder shape, so as to form a direction of the magnetic force lines as shown in FIG. 7. The magnetic force lines of the side magnet 32 facing the central magnet 31 are combined to the magnetic force lines facing downward of the central magnet 31 to form a strong magnetic field facing toward the coil assembly 4, to ensure the strong interaction force between the coil assembly 4 and the magnetic assembly 3.

Optionally, the connection manner for connecting the central magnet 31 and the side magnet 32 may be welding or bonding. When the central magnet 31 and the side magnet 32 are connected by welding, not only the connection stability therebetween can be ensured, but also a continuous and stable magnetic circuit can be formed, to ensure continuity and stability of the magnetic circuit of the magnetic assembly 3. When the central magnet 31 and the side magnet 32 are connected by bonding, the connection stability therebetween can also be ensured, and the operation is convenient and the cost is low.

Figure 4:
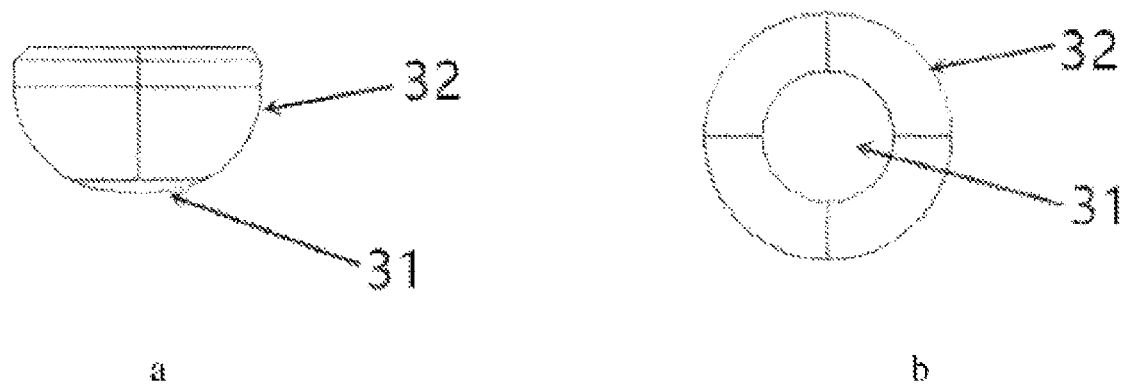

Optionally, the number of the side magnet 32 may be one, two, three, four, five or six, and when the number of the side magnet 32 is one, the side magnet 32 may be an annular magnet. Referring to FIGS. 3 and 4, in one specific embodiment, the number of the side magnet 32 is four, and each of the side magnets 32 has the same size, all of which has a structure similar to a quarter ring, the four side magnets 32 surround the central magnet 31 and are connected with each other, and the four side magnets 32 may be welded or bonded in pairs. The central magnet 31 and side magnets 32 around the central magnet 31 form a compact structure of the magnetic assembly 3, and generate a strong magnetic field together, to ensure the magnetic field strength and stability of the manipulating device.

Figure 5:
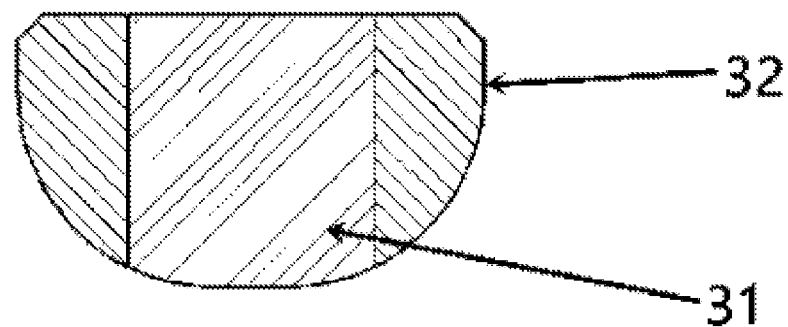
FIG. 5 is a schematic cross-sectional view of the magnetic assembly of the manipulating device according to the present disclosure.

Optionally, referring to FIG. 5, the edge of the side magnets 32 may be provided with a chamfer, and the chamfer may be an arc-shaped chamfer, or may be an approximately arc-shaped chamfer formed by one or more inclined surfaces. The arrangement of the structure of the chamfer not only facilitates the arrangement and extension of the magnetic force lines of the side magnets 32, but also avoids stress concentration at the edge of the side magnets 32, to improve the service life of the side magnet 32.

Optionally, the manipulating device further comprises a housing (not shown in the drawing), and both the supporting member 2 and the coil assembly 4 are fixedly connected to the housing.

Fixedly connecting the supporting member 2 and the housing can ensure the stability of the supporting member 2 and provide stable support to the rotation of the rocker 1. Further, fixedly connecting the coil assembly 4 and the housing can provide stable structural support to the coil assembly 4, and can form a relatively fixed structure with respect to the supporting member 2, to ensure the relative position and the strong interaction force between the magnetic assembly 3 and the coil assembly 4.

Figure 2:
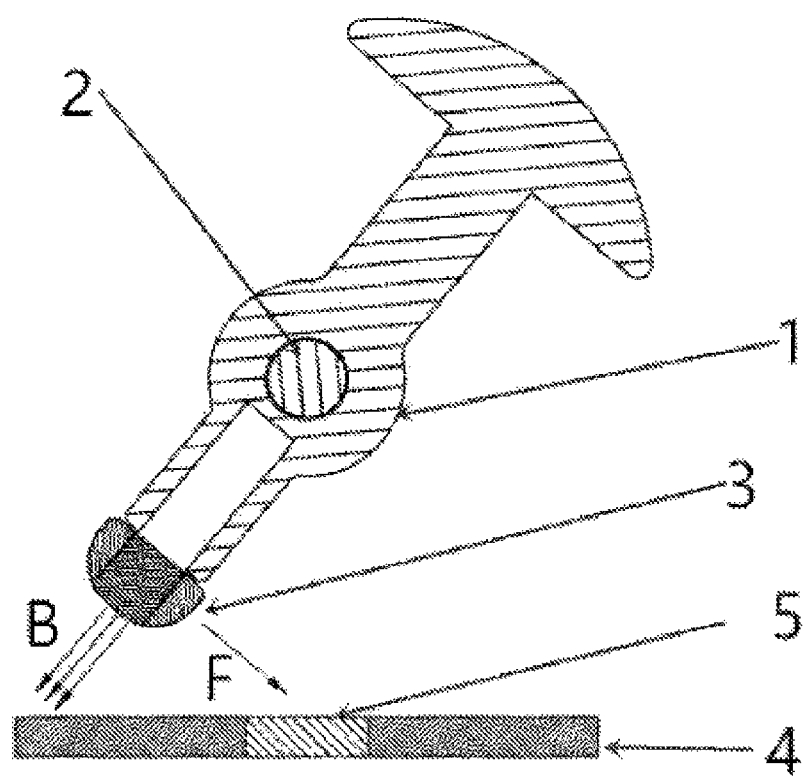
FIG. 2 is a schematic structural diagram of the manipulating device at a certain rotational position according to the present disclosure.

Optionally, referring to FIGS. 1 and 2, the manipulating device further includes a fitting member 5, the fitting member 5 may be an iron core or a magnet, and the fitting member 5 is positioned in the middle of the coil assembly 4.

The coil assembly 4 may be an annular coil with a hollow structure, and the fitting member 5 is disposed in the hollow structure of the coil assembly 4 and is connected to an inner side of the coil assembly 4. In addition, the fitting member 5 may also be fixedly connected to the housing.

When the fitting member 5 is an iron core, the fitting member 5 can generate a strong attractive force F to the magnetic assembly 3. Thus, regardless whether or not the coil assembly 4 is energized, both the rocker 1 and the magnetic assembly 3 can automatically return to a balancing position under the attractive force of the fitting member 5, moreover, when the coil assembly 4 is energized, the iron core can also enhance the magnetic field generated by the coil assembly 4. When the fitting member 5 is a magnet, the sides of the fitting member 5 and the magnetic assembly 3 that are adjacent to each other may have opposite polarities, so that the fitting member 5 can generate a strong attractive force F to the magnetic assembly 3 after the rocker 1 and the magnetic assembly 3 rotate by certain angles. regardless whether or not the coil assembly 4 is energized, both the rocker 1 and the magnetic assembly 3 can automatically return to the balancing position under the attractive force of the fitting member 5, and the manipulation is flexible and simple, the control is precise.

Optionally, within the range in which the direction of the magnetic force lines of the central magnet 31 is parallel to the axial direction of the central magnet 31 having the cylinder shape, the direction of the interaction force between the coil assembly 4 and the magnetic assembly 3 is parallel to the tangent direction tangent to the rotation direction of rocker 1. The coil assembly 4 may be an annular coil, and the arrangement that the direction of the interaction force between the coil assembly 4 and the magnetic assembly 3 is parallel to the tangent direction tangent to the rotation direction of rocker 1 can ensure that the rocker 1 can always be subjected to the interaction force perpendicular to the axial direction of the rocker 1 in the process during the rocker 1 drives the magnetic assembly 3 to rotate, so as to sufficiently exert the electromagnetic interaction between the magnetic assembly 3 and the coil assembly 4, and provide a more effective force to the manipulating device.

Optionally, the central axis of the coil assembly 4 passes through the center around which the rocker 1 rotates. By the arrangement that the central axis of the coil assembly 4 passes through the center around which the rocker 1 rotates, a balancing position can be achieved when the distance between the magnetic assembly 3 and the coil assembly 4 is the shortest; when the manipulating device is in an idle state, the rocker 1 and the magnetic assembly 3 can be stably positioned in the balancing position, and moreover, when the magnetic assembly 3 rotates around the balancing position, it can maintain a relatively symmetrical distance between the magnetic assembly 3 and the coil assembly 4, so as to exert a relatively symmetrical force, to provide a better use experience for the manipulating device.

Optionally, referring to FIG. 1, the rocker 1 is symmetrically disposed with respect to an A-A plane, and the A-A plane is a rotating surface which passes through the center around which the rocker 1 rotates and the center of the coil assembly 4 and rotates in any plane in perpendicular to the rocker 1. In FIG. 1, the center around which the rocker 1 rotates (that is, the center of the supporting member 2) is positioned in the A-A plane. When the rocker 1 is symmetrically disposed with respect to the A-A plane, it can also ensure that a center of gravity of the rocker 1, the center around which the rocker 1 rotates and the center of the coil assembly 4 are located on the same line, so that when the rocker 1 is in the balancing position, the direction of gravity of the rocker 1 passes through the center of the supporting member 2, the action force arm of the gravity of the rocker 1 is zero, thus the rocker 1 can be maintained in a stable balancing state. Moreover, in the process during the rocker 1 rotates, the rocker 1 can maintain a symmetrical rotation state on both sides of the balancing position.

The present disclosure also discloses a game terminal, which comprises the manipulating device.

The manipulating device of the present disclosure can be used as an interactive terminal for AR or VR games, such as a high-quality handle with a vibration feedback function, so as to be capable to provide a better manipulation experience to the user.

Although some specific embodiments of the present disclosure have been described in detail by examples, those skilled in the art should understand that the above examples are only for illustration, not to limit the scope of the present disclosure. Those skilled in the art should understand that the above embodiments may be modified without departing from the scope and spirit of the present disclosure. The scope of the present disclosure is defined by the appended claims.

What is claimed is:

1. A manipulating device, comprising:
   a rocker, one end of the rocker is a manipulation end, the other end of the rocker is provided with a magnetic assembly, and the rocker is configured to be rotatable; and
   a coil assembly disposed opposite to the rocker and adjacent to the magnetic assembly, the coil assembly is a planar coil,
   wherein the magnetic assembly comprises a central magnet and at least one side magnet, and the coil assembly is configured to be capable of being supplied with an electrical signal, and an interaction force is generated between the coil assembly and the magnetic assembly
   wherein the manipulating device further comprises a fitting member, the fitting member is an iron core, and the iron core is positioned in the middle of the coil assembly.

2. The manipulating device according to claim 1, wherein the central magnet is formed to have a column shape, and one end of the central magnet having the column shape is fixedly connected to the rocker.

3. The manipulating device according to claim 2, wherein the other end of the central magnet having the column shape is formed to have a spherical surface.

4. The manipulating device according to claim 1, wherein a magnetization direction of the central magnet is parallel to an axial direction of the central magnet having the column shape, and a magnetization direction of the side magnet is perpendicular to the axial direction of the central magnet having the column shape.

5. The manipulating device according to claim 1, further comprises a supporting member, and the rocker is rotatable around the supporting member.

6. The manipulating device according to claim 5, further comprises a housing, and both the supporting member and the coil assembly are fixedly connected to the housing.

7. The manipulating device according to claim 1, further comprises a fitting member, wherein the fitting member is a magnet, and the magnet is positioned in the middle of the coil assembly.

8. The manipulating device according to claim 1, wherein a central axis of the coil assembly passes through a center around which the rocker rotates.

9. The manipulating device according to claim 1, wherein the rocker is symmetrically disposed with respect to an A-A plane.

* * * * *